United States Patent [19]
Yoshida et al.

[11] 3,830,697
[45] Aug. 20, 1974

[54] PROCESS FOR PRODUCING AMYLOSES

[75] Inventors: Mikihiko Yoshida, Okayama-shi; Mamoru Hirao, Okayama, both of Japan

[73] Assignee: Hayashibara Company, Okayama-shi, Okayama, Japan

[22] Filed: Sept. 2, 1969

[21] Appl. No.: 854,760

[30] Foreign Application Priority Data
Sept. 3, 1968  Japan.................................. 43-63172

[52] U.S. Cl. ................................. 195/31 R, 195/62
[51] Int. Cl. ............................................. C13l 1/08
[58] Field of Search ....................................... 195/31

[56] References Cited
UNITED STATES PATENTS

| | | | |
|---|---|---|---|
| 3,532,602 | 10/1970 | Seidman | 195/31 |
| 3,556,942 | 1/1971 | Hathaway | 195/31 |
| 3,560,345 | 2/1971 | Yokobayashi et al. | 195/31 |

*Primary Examiner*—Alvin E. Tanenholtz
*Attorney, Agent, or Firm*—Browdy and Neimark

[57] ABSTRACT

Production on an industrial scale of amylose having a high purity is made possible by a process for producing amylose mainly composed of a high molecular amylose, wherein amylomaize starch having a high amylose content or amylose starch separated from sweet potato starch, white potato starch or corn starch is subjected to hydrolysis to selectively hydrolyze only $\alpha$-1,6-glucoside bond of the arborescent structure of amylopectin contained therein in an amount of 20–40 percent with $\alpha$-1,6-glucosidase, i.e., an enzyme produced by Aerobacter, Pseudomonas, Lactobacillus or Escherichia, thereby obtaining starch of amylose type.

1 Claim, No Drawings

PROCESS FOR PRODUCING AMYLOSES

DETAILED DESCRIPTION OF THE INVENTION

The present invention relates to a process for producing amyloses mainly composed of high molecular amylose wherein a starch containing more than 50 percent of amylose, such as starch of amylomaize, is subjected to the gelatinization to gelatinize amylopectin contained therein, and then the branched bonds thereof are hydrolyzed with α-1,6-glucosidase, thereby obtaining straight chain amylose.

Natural underground and overground starches, such as starches from sweet potato, wheat, tapioca and corn, always contain amylose and amylopectin. Amylose is only composed of α-1,4-glucoside bonds structure, while amylopectins are high molecules or arborescent structure, consisting of numerous branches of straight chain of α-1,4-glucoside bonded laterally by a-1,6-glucoside bonds. Common starches are composed of about 20 – 25 percent of amylose and the remainder of amylopectin.

Amylose has a straight chain structure having a polymerization degree of higher than 1,000, and therefore it is liable to be crystallized. In addition, since amylose has structure similar to that of cellulose, it is liable to form a film, whereas amylopectin is liable to be swelled and to form a gelated product due to its arborescent, complicated macromolecular form. The solutions have a high coefficient of viscosity and they are used as paste.

Thus, natural starches consisting of mixture of amylose and amylopectin have properties dissimilar to one another and uniform properties are not easily obtainable due to the differences between both components' character and their mixing ratio. Therefore characteristics of amylose or amylopectin in natural starch cannot be utilized 100 per cent.

The graph below, shows influence of amylopectin incorporated in amylose film on the film flexibility. As for bending strength, amylose film is 1,400 (Schopper Double Folds Unit), whereas starch having a high amylose content (containing 50 percent amylopectin) is about 100 and ordinary starch containing 80 percent amylopectin is lower than 100. Thus, it is evident that there is a great difference between pure amylose and starch containing both amylose amylopectin in their film-forming characters.

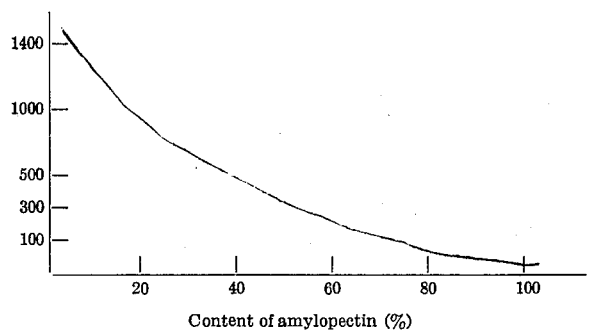

Content of amylopectin (%)

For the reasons as above mentioned, various methods of isolating amylopectin and amylose respectively or of obtaining them at a high purity have been discussed, and partially commercialized.

Amylopectin may be obtained in natural starches such as glutinous rice starch and waxy corn starch in almost pure form, but amylose is contained in natural starches only in a small amount and there if found no natural starch containing 100 percent amylose.

After the investigations on the development of a new kind of corn having starch of high amylose content, a starch having around 60 percent amylose content has been produced in U.S.A. However, this kind of corn must be grown in a particular area in a particular manner and is expensive. In addition, it still contains 20 – 40 percent of amylopectin, and is lacking in practicality.

On the other hand, a method has been put into practice wherein white potato starch is gelatinized, to which is then added an inorganic salt and finally the two major components are fractionally precipitated, and thus resulting starches have been put on the market as amylose and amylopectin. However, amylose obtained in this manner has a purity of about 80 percent due to the content of a considerable amount of amylopectin, and the polymerization degree thereof is around 400 as a result of greater decomposition degree than that of amylose contained in natural starch. Thus, it has been impossible to produce pure, high molecular amylose not containing amylopectin, which is of different structure, on a commercial scale. From the above mentioned view point, the inventors discussed many ways for obtaining high molecular amylose containing no amylopectin, i.e. amylose closely near natural amylose. The inventors tried a method in which amylomaize startch or amylose starch having high amylose content which are separated from sweet potato starch, white potato starch, corn starch or the like is subjected to the enzymatic decomposition to decompose only the branched part of arborescent structure of amylopectin, contained in an amount of 20 – 50 percent, thus obtaining only the amylose structure. As for enzymes which hydrolyze selectively only the branced bond of amylopectin, i.e. α-1,6-glucoside bond, there are pullulanase disclosed in U.S. application Ser. No. 733,325 now U.S. Pat. No. 3,622,460, isoamylase produced by Pseudomonas described in U.S. application Ser. No. 733,326 now U.S. Pat. No. 3,560,345, enzymes produced by Lactobacillus described in U.S. application Ser. No. 810,293 and now abandoned and enzymes produced by Escherichia described in U.S. application Ser. No. 749,288 now U.S. Pat. No. 3,716,455, Klebsiella. The above mentioned enzymes are more or less different from one another in optimum pH, optimum temperature and substrates they act on. The α-1,6-glucoside bonds of any starch is hydrolyzed by such enzymes. It was confirmed, therefore, that the purpose may be attained by using one or more of the enzymes.

Namely, purified amylomaize starch in the form of aqueous suspension is heated to obtain sufficient dispersion and pH and temperature thereof are adjusted, an enzyme to cut (hydrolyze) the branched structure of amylopectin into straight chain amylose starch. It is preferable in the gelatinization of starch to choose a temperature as low as possible and to effect the heating in an inert gas such as nitrogen, since as reported in the literature the molecular weight of the amylose molecule is reduced due to the cutting of long chained amylose molecule by the high temperature treatment or by the contact with oxygen of air at a high temperature As a matter of course, the gelatinization is easier at a dilute starch concentration. At a concentration higher than 15 percent, the gelatinization at around 100°C is frequently difficult. The gelatinized amylomaize starch is cooled immediately to 45° – 55°C, to which is then added an adequate amount of an enzyme and the reaction is effected for 1 – 2 days at a pH 4.5 – 6. If a relatively heat stable enzyme of Lactobacillus is used, the enzyme is added at 55°C at pH 6 and then the mixture is cooled to 45°C. In case of Pseudomonas enzyme, pH of 4.5 – 5.5 is preferable. Thus, by the treatment of gelatinized amylose with isoamylase ($\alpha$-1,6-glucosidase), long chain amylose part under reaction is precipitated. The precipitates are then subjected to the centrifugation, washed with a small amount of arm and finally dried. The separated supernatant liquid is condensed and cooled to recover major part of amylose. The decomposed liquor after the reaction may be condensed under vacuum into one-third – one-fourth volume to recover major part of amylose. The polymerization degree was determined according to the periodate oxidation to give polymerization degree of above 700 (the former) and average polymerization degree of 200 – 100 (the latter). The determination of degree of branching according to Smith's method J. Am. Chem. Soc. 78 5907 (1956) Methods in Carbohydrate Chemistry V 251 (1965) Academic Press, showed that the former has straight chain structure having no branch and the latter has coefficient of near 1 which suggests that only small branches remain. When the solution is diluted 100 percent maltose is formed with $\beta$-amylase. This fact also suggests that products obtained by the treatment are almost of straight chain amylose.

As described above in detail, pure amylose mainly composed of high molecule closely near to natural amylose containing no $\alpha$-1,6-glucoside bond, i.e. no branched structure may be produced by the treatment of gelatinized strach liquor prepared from starch containing more than 50 percent of amylose with $\alpha$-1,6-glucosidase. Thus, the present invention provides a process for producing pure, high molecular amylose most suitable for the production of pure amylose derivatives or products utilizing the properties of pure amylose. Therefore, the invention has an industrial significance.

The invention will be illustrated below by way of examples.

EXAMPLE 1

Purified amylomaize starch in the form of 5 percent aqueous suspension is heated to 100°C under stirring at pH 6.0 to gelatinize it. It is further heated to 130°C in nitrogen stream and stirred for 20 minutes to complete the gelatinization. Thereafter it is quickly cooled to 45°C and pH thereof is adjusted quickly to 4.5, to which is then added an enzyme of Pseudomonas (a product purified by salting out and precipitated in alcohol of an amount of 50 units per gram of starch). The whole is reacted at 45°C under stirring for 1.5 days. While precipitates increase as time passes. 36 hours later, the precipitated amylose is subjected to the centrifugation, then suspended in the same amount of warm water, and thereafter subjected again to the centrifugation, and the precipitated amylose is dried at room temperature under vacuum. The supernatant liquor is condensed to one-half volume under reduced pressure and then kept at 5° – 0°C for 12 hours. The resulting precipitates are separated, washed with warm water and dried. Yields are 40 percent (the former case) and 30 percent (the latter one) based on the dry raw material The determination of polymerization degree with periodic acid shows the degrees of 780 (the former) and 130 (the latter). The determination according to Smith's decomposition method shows that there is observed no branch in the former and that the latter has one branch per molecule as an average. The hydrolysis with $\beta$-amylase effected at 0.5 percent concentration, at pH 6.0 at 55°C for 12 hours shows 100 percent yield as maltose in the former and 85 percent in the latter.

EXAMPLE 2

In the same manner as in Example 1, amylomaize starch gelatinized in nitrogen stream and cooled is adjusted to pH 5.5 at 60°C, to which is then added an enzyme of Lactobacillus of an amount of 50 units per gram of starch. The whole is stirred before aging and cooled at 45°C while the reaction is carried out, to which is added 20 units per gram of starch of pullulanase produced by Aerobacter. The reaction is carried out under stirring at 45°C for 40 hours in total. The reaction liquid is condensed to one-third volume under vacuum and cooled overnight at 5° – 0°C. The precipitated part is again suspended in three times as much amount of cold water. After the centrifugal precipitation, it is dried under aeration at 40°C. The yield is 82 percent on the dry raw material and average polymerization degree is 520. The enzyme that has been salted out with ammonium sulfate was used herein.

EXAMPLE 3

Amylomaize starch thoroughly washed with water and sieved, in the form of 3 percent aqueous suspension, is heated to 100°C under stirring to obtain almost gelatinized product, which is then heated under the pressure of 1.5 Kg/cm$^2$ for 30 minutes to complete the dispersion. The gelatinized liquid is cooled quickly to 60°C, and pH is adjusted to 5.5, to which is then added 60°C an aqueous solution of salted out enzyme of Lactobacillus of an amount fo 50 units per gram of starch. Under vigorous stirring, the whole is cooled at 45°C during 1.5 hours. The hole is kept at 45°C to carry out the reaction for 35 hours under stirring. Thereafter, the resulting precipitates are centrifugalized. The product is washed once with a small amount of water and subjected to the centrifugation to obtain 43 percent, based on the dry raw starch, of white, dry amylose precipitates. The supernatant liquid is condensed and cooled to obtain additional 30 percent of white amylose. The determination of average polymerization degree shows the degree of 580 in the former and 160 in the latter. The determination according to Smith's decomposition method suggests that the former has no branch whereas the latter has about one branch per molecule. The hydrolysis with $\beta$-amylase gives 99 percent yield as maltose in the former and 80 percent yield in the latter. Therefore, it may be concluded that amylose of a very high purity, as a whole, may be obtained.

The nitrogen analysis shows protein of less than 0.1 percent and ignition residue of 0.09 percent, thus suggesting a very high purity.

What is claimed is:

1. A process for producing amylose mainly composed of a high molecular amylose comprising gelatinizing a water suspension of up to 15 percent starch concentration containing up to 50 percent of amylose, adding to the gelatinized starch at a temperature of about 60°C. and at about pH 5.5 an $\alpha$-1,6-glucosidase from the genus Lactobacillus, cooling the mixture to about 45°C. and maintaining the mixture for 1 – 2 days at a temperature of about 45°C. to cut the branched part of amylopectin contained in said starch and to obtain straight chain structure.

* * * * *

UNITED STATES PATENT OFFICE
CERTIFICATE OF CORRECTION

Patent No. 3,830,697  Dated August 20, 1974

Inventor(s) Mikihiko Yoshida and Mamoru Hirao

It is certified that error appears in the above-identified patent and that said Letters Patent are hereby corrected as shown below:

Column 1, line 16, "or" should read --of--
Column 2, line 55, after "enzyme" insert --is then added--
"      2, line 50, after "literature" insert --,--
Column 3, line 10, "arm" should read --warm water--
Column 4, line 36, "fo" should read --of--
"      4, line 38, "hole" should read --whole--
"      4, line 60, "up to" should read --at least--

Signed and sealed this 24th day of December 1974.

(SEAL)
Attest:

McCOY M. GIBSON JR.
Attesting Officer

C. MARSHALL DANN
Commissioner of Patents

FORM PO-1050 (10-69)